United States Patent [19]
Machijima

[11] Patent Number: 6,089,111
[45] Date of Patent: Jul. 18, 2000

[54] SENSOR MOUNTING DEVICE IN FLUID PRESSURE CYLINDER

[75] Inventor: Mitsuru Machijima, Ibaraki, Japan

[73] Assignee: SMC Corporation, Tokyo, Japan

[21] Appl. No.: 09/098,624

[22] Filed: Jun. 17, 1998

[30] Foreign Application Priority Data

Jul. 16, 1997 [JP] Japan .................................. 9-207187

[51] Int. Cl.[7] .............................................. G01M 19/00
[52] U.S. Cl. .......................................... 73/866.5; 92/5 L
[58] Field of Search ............................. 73/866.5, 865.9; 92/5 R, 5 L

[56] References Cited

U.S. PATENT DOCUMENTS

| D. 404,638 | 1/1999 | Machijima | D8/354 |
|---|---|---|---|
| 4,086,456 | 4/1978 | Bone | 92/5 R X |
| 4,230,023 | 10/1980 | Ward | 92/5 L |
| 4,594,487 | 6/1986 | Grassl et al. | 200/82 E |
| 4,736,674 | 4/1988 | Stoll | 92/5 R |
| 4,752,657 | 6/1988 | Kane et al. | 73/745 X |
| 4,800,241 | 1/1989 | McNamara | 200/82 E |
| 5,455,509 | 10/1995 | Semura et al. | 73/866.5 X |
| 5,884,549 | 3/1999 | Hosono et al. | 92/5 R |

FOREIGN PATENT DOCUMENTS 206810  9/1986  Japan .

*Primary Examiner*—Thomas P. Noland
*Attorney, Agent, or Firm*—Oblon, Spivak, McClelland, Maier & Neustadt, P.C.

[57] ABSTRACT

A fixture 21 for mounting a sensor 20 on a fluid pressure cylinder is composed of a proximal end 21a that is attached to a tie rod 5 of the cylinder; and a tip portion 21b that abuts a cylinder tube to establish the position of the fixture 21. The proximal end 21a has a first mounting groove 22 in which the tie rod 5 is fitted; and first set screws 26 for fixing the fitted tie rod 5. A second mounting groove 23 in which the sensor 20 can be mounted in such a way that its position can be adjusted is formed in the tip portion 21b.

3 Claims, 3 Drawing Sheets

SENSOR MOUNTING DEVICE IN FLUID PRESSURE CYLINDER

FIELD OF THE INVENTION

The present invention relates to a sensor mounting device for mounting on a fluid pressure cylinder a sensor that detects the operating position of a piston, and in particular, to a fixture for simply and reliably mounting the sensor using a tie rod of the fluid pressure cylinder.

PRIOR ART

A sensor such as a magnetic proximity switch is mounted on a fluid pressure cylinder to detect the operating position of a piston. In a cylinder in which a cylinder tube and covers at the respective ends of the cylinder are coupled using tie rods, the sensor is normally mounted using the tie rod.

FIGS. 3 to 5 show a well-known mounting device for mounting a sensor 10 on a tie rod 5 of a cylinder 1. The cylinder 1 comprises a cylinder tube 2; and a head cover 3 and a rod cover 4 provided at the respective axial ends of the tube 2, wherein the tube and the covers are integrally coupled together using a plurality of (in the figure, four) tie rods 5 and nuts 6. An annular permanent magnet (not shown) used to detect the position is mounted on the outer circumferential surface of a piston (not shown) that moves back and forth through the tube 2 in an air tight manner, and the sensor 10 detects this permanent magnet.

Reference numeral 7 in the figures designates a piston rod, 3a and 4a are compressed-air supply and discharge ports, and 8 is a plug used to adjust the speed of the piston by regulating the exhaust flow.

A fixture 11 for mounting the sensor 10 on the tie rod 5 comprises a first mounting groove 12 in which the tie rod 5 is fitted; a plurality of tapped holes 13 the tips of which are opened into the first mounting groove 12; first set screws 15 that are attached to the tapped holes 13; and a tapped hole 14 provided nearly perpendicular to the tapped holes 13 for mounting the sensor. The tie rod 5 is fitted in the first mounting groove 12, the first set screws 15 are tightened to pressure-contact their tips with the tie rod 5 in order to fix the fixture to the tie rod 5 at an arbitrary longitudinal position.

On the other hand, the sensor 10 includes a mounting portion 17 that protrudes laterally from a body 16. The sensor 10 is mounted in the sensor fixture 11 by screwing a second set screw 18 in the tapped hole 14 through a hole 17a provided in the mounting portion 17. The sensor 10 then has its bottom abutting the outer surface of the cylinder tube 2.

In this manner, the tie rod 5 can be used to mount the sensor simply, but the conventional sensor mounting device is disadvantageous in that the fixture 11 and sensor 10 cannot be mounted on the tie rod 5 in the correct positions unless the sensor 10 is mounted in the fixture 11 beforehand. In other words, without the sensor 10, the fixture 11 can rotate around the tie rod 5 freely to prevent its mounting angle from being fixed. Consequently, the fixture 11 cannot be fixed to the tie rod 5 at the correct angle unless the fixture 11 is mounted on the sensor 10 beforehand in such a way that the sensor 10 tightens the set screws 15 at a position at which the sensor 10 abuts the outer surface of the cylinder tube 2, as shown in FIG. 4.

Due to such a limit on the sensor mounting operation, the conventional mounting device does not operate efficiently. In addition, to replace the sensor, two operations must be performed; an operation for loosening the second set screw 18 to remove the sensor 10 from the fixture 11 and an operation for loosening the first set screws 15 to loosen the fixture 11. This is extremely cumbersome. Furthermore, since the set screws 15 and 18 are attached in different directions that are mutually perpendicular, it is very difficult to perform relevant operations from two directions in a small working space using a tool such as a driver. Furthermore, to adjust the mounting position of the sensor 10, the fixture 11 must be loosened to move the device 11 and sensor 10 together along the tie rod 5.

DISCLOSURE OF THE INVENTION

It is a primary object of this invention to provide a sensor mounting device that enables efficient mounting operations, wherein a fixture can be independently mounted on a tie rod of a cylinder in the correct position without being mounted on a sensor beforehand, thereby enabling the fixture mounted on the tie rod to be mounted on the sensor.

It is another object of this invention to provide the mounting device that enables the sensor to be independently installed and removed without loosening the fixture, thereby improving the workability during maintenance.

It is yet another object of this invention to provide the mounting device that enables set screws for fixing the fixture and sensor to be rotated easily even in a small working space using a tool.

To achieve these objects, this invention provides a sensor mounting device consisting of a sensor and a fixture.

The fixture has a proximal end that is attached to the tie rod and a tip portion that abuts a cylinder tube to establish the position of the fixture.

The proximal end has a first mounting groove in which the tie rod is fitted; and first set screws for fixing the fitted tie rod to the fixture.

On the other hand, a second mounting groove is formed in the tip portion, and the sensor can be mounted in this groove in such a way that the position of the sensor can be adjusted in the axial direction of the cylinder tube.

According to this invention of this configuration, the fixture can be independently mounted on the tie rod at the correct angle by fixing the fixture to the tie rod while the tip portion of the fixture abuts the cylinder tube. Thus, the sensor can be independently mounted in the fixture mounted on the tie rod, thereby improving the workability during mounting. In addition, to replace the sensor or to adjust its position, the sensor can be independently installed and removed without loosening the fixture, thereby improving the workability during maintenance.

According to a specific embodiment of this invention, the sensor can be anchored in the mounting groove at an arbitrary position using a second set screw, so the second set screw and the first set screws for the fixture can be provided in the same direction so as to be rotated from the same direction using a tool.

This configuration eliminates the need for working spaces in two directions, thereby enabling the above operation to be reliably preformed even in a small working space using the tool.

According to this invention, the mounting groove preferably has a cross section shaped in such a way that the groove width of its opening is smaller than its internal groove width, while the sensor has a lateral width that is smaller than the internal groove width of the mounting groove but that is larger than the groove width of the opening. Thus, by rotating the second set screw penetrating the sensor in its thickness direction to pressure-contact the tip of the screw with the groove bottom of the mounting groove, the sensor is pressed against the edge of the opening of the mounting groove from the inside of the groove for fixation.

DETAILED DESCRIPTION

Figure 1:
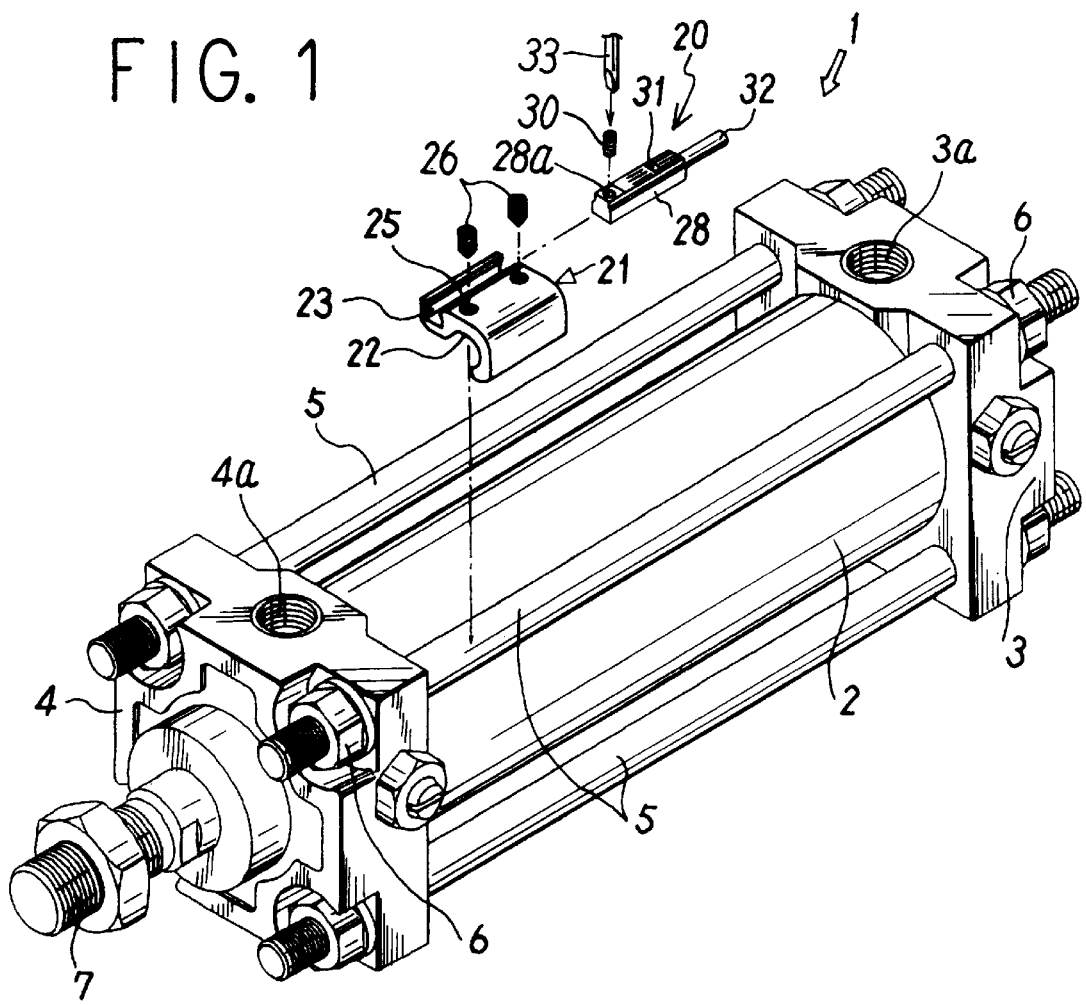
FIG. 1 is an exploded perspective view showing one embodiment of a sensor mounting device according to this invention.
Figure 2:
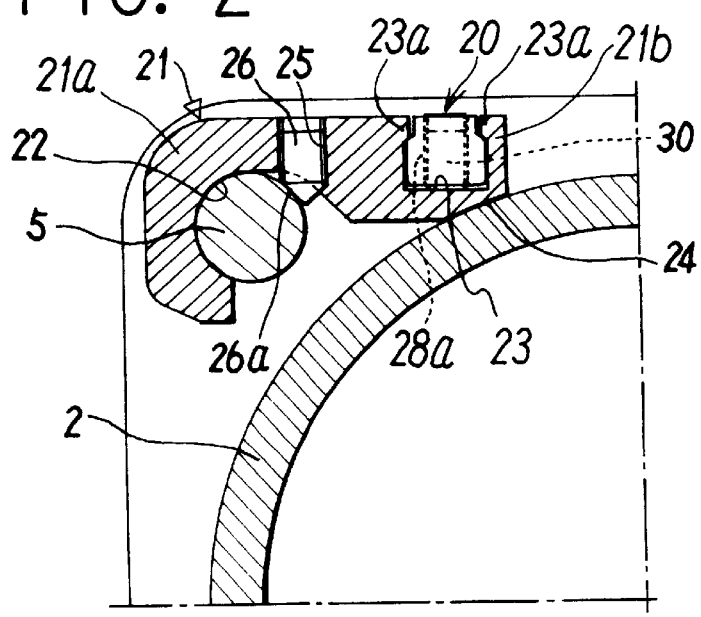
FIG. 2 is a schematic sectional view showing a state in which the sensor mounting device according to this invention is mounted on a tie rod of a cylinder.
Figure 3:
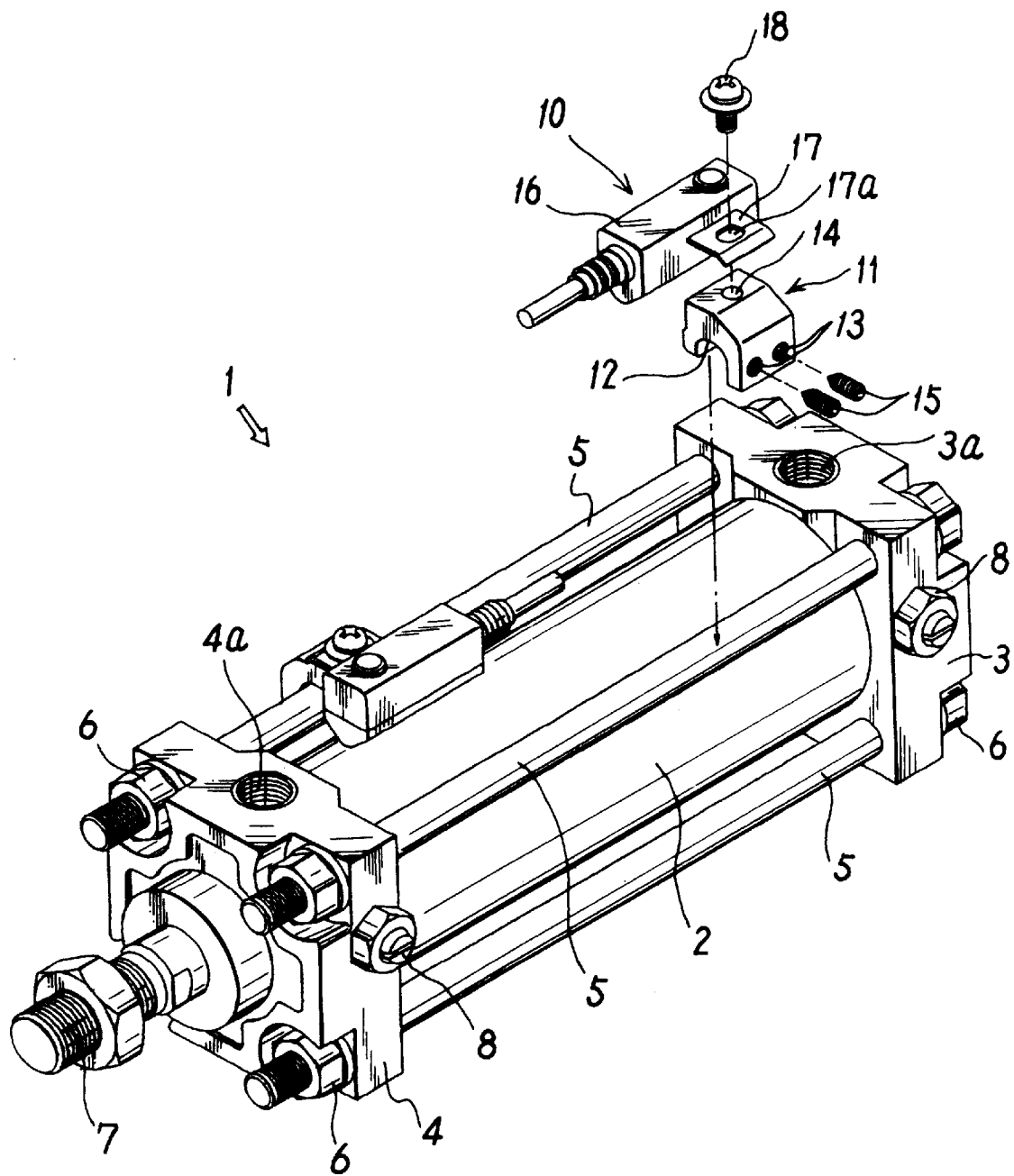
FIG. 3 is an exploded perspective view of a conventional sensor mounting device.
Figure 4:
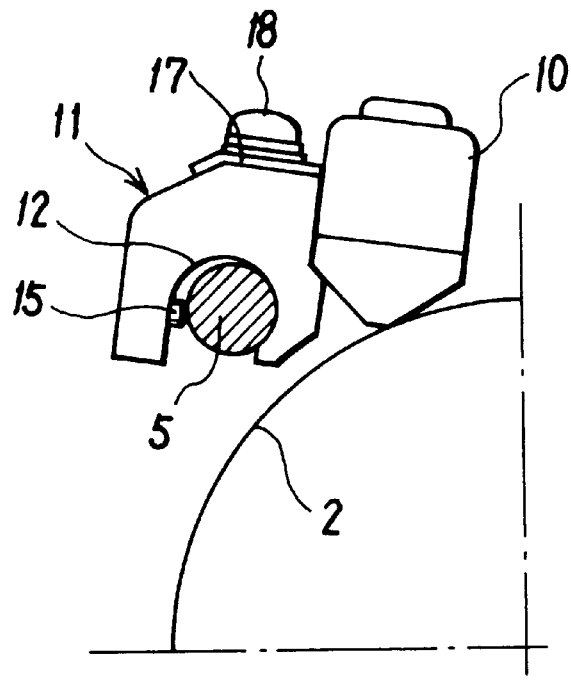
FIG. 4 is a schematic sectional view showing a state in which the sensor mounting device in FIG. 3 is mounted on a tie rod.
Figure 5:
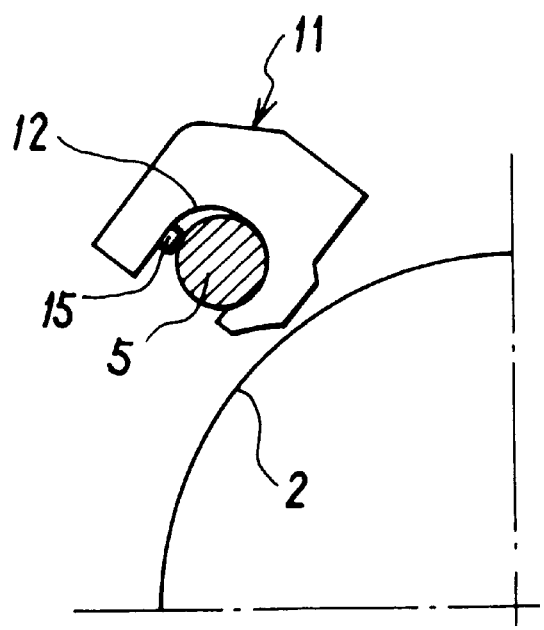
FIG. 5 is a schematic sectional view showing a state in which the sensor in FIG. 4 is not mounted.

FIGS. 1 and 2 show a preferred embodiment of a sensor mounting device according to this invention. A fluid pressure cylinder 1 on which a sensor 20 is mounted has the same configuration as the cylinder 1 shown in FIG. 3. Thus, the same main components in the figures have the same reference numerals, and their detailed description is omitted.

The sensor mounting device comprises the sensor 20 for detecting the operating position of a piston in the cylinder 1; and a fixture 21 for mounting the sensor 20 on a tie rod 5 of the cylinder 1.

The fixture 21 consists of a proximal end 21a that is attached to the tie rod 5; and a tip portion 21b that abuts the outer surface of a cylinder tube 2 to establish the position of the fixture 21. The fixture has a hook-like cross section the tip of which is bent and that is integrally formed of a non-magnetic substance material such as synthetic resin or aluminum.

The proximal end 21a has a first mounting groove 22 in which the tie rod 5 is fitted; a plurality of tapped holes 25 located at a position close to the tip portion 12b relative to the center of the tie rod 5 and cut toward the first mounting groove 22; and first set screws 26 that are screwed into the tapped holes 25. The fixture 21 can be fixed to the tie rod 5 by tightening the first set screws 26 to pressure-contact their tips 26a against the tie rod 5. The first mounting groove 22 is sized so that half or more of the circumference of the tie rod 5 can be fitted in the groove.

On the other hand, the tip portion 21b has a circular abutting portion 24 that snugly abuts the outer surface of the cylinder tube 2; and a second mounting groove 23 in which the sensor 20 is mounted in such a way that its position can be adjusted in the axial direction of the cylinder tube 2. The second mounting groove 23 is formed near the abutting portion 24 and parallel to the first mounting groove 22.

The edges 23a, 23a of the opening of the second mounting groove 23 is formed to protrude toward the inside of the groove so that the groove width of the opening is smaller than the internal groove width, thereby allowing the edges 23a, 23a to work as engagement portions for preventing the sensor 20 from slipping out.

In addition, the sensor 20 has a elongated body 28 that can be inserted into the mounting groove 23 from the groove end. The lateral width of the body 28 is formed to be smaller than the internal groove width of the second mounting groove 23 while being larger than the groove width of the opening in order to prevent the body from slipping out from the opening. The sensor 20 has a tapped hole 28a penetrating the body 28 in its thickness direction; and a second set screw 30 that is screwed into the tapped hole 28a. When the second set screw 30 is tightened using a tool 33 such as a driver in order to pressure-contact the tip of the screw with the groove bottom of the mounting groove 23, both shoulders of the sensor 20 abut the edges 23a, 23a of the mounting groove 23 from the inside of the groove to anchor the sensor 20 in the mounting groove 23 at an arbitrary position.

Reference numeral 31 in the figure denotes a lamp formed on the top surface of the sensor 20 and indicating the operational condition of the sensor, and 32 is a lead drawn from the end of the body.

The first set screws 26 for fixing the fixture 21 to the tie rod 5 and the second set screw 30 for fixing the sensor 20 to the fixture 21 are attached in the same direction, thereby enabling these set screws 26 and 30 to be rotated from the same direction using a tool such as a driver or a wrench. This configuration eliminates the need for working spaces in two directions that allow the set screws 26 and 30 to be rotated, thereby enabling the above operation to be reliably performed even in a small working space using the tool.

The sensor 20 is a magnetic proximity switch that senses the magnetism of a permanent magnet mounted on the piston, but may be a sensor based on a different detection method. For example, a high-frequency sensor can be used that detects an induced current flowing through metal mounted in the piston.

To mount the sensor 20 on the cylinder 1 using the sensor mounting device of the above configuration, the tie rod 5 is fitted in the first mounting groove 22 at the proximal end 21a of the mounting device 21, and the abutting portion 24 of the tip portion 21b is then allowed to abut the outer surface of the cylinder tube 2. Subsequently, the first set screws 26 are tightened with the abutting portion 24 abutting the outer surface of the cylinder tube 2. This operation enables the fixture 21 to be simply and reliably mounted on the tie rod 5 at the correct mounting angle. In this case, the sensor 20 may or may not be mounted in the second mounting groove 23 in the fixture 21 beforehand. Alternatively, the second set screw 30 may be tightened slightly to temporarily fix the sensor 20 so that the sensor will not slip out from the groove. The second set screw 30 may then be fixed after the fixture 21 has been mounted.

Next, if the sensor 20 is not mounted in the second mounting groove 23 beforehand, it is inserted into the second mounting groove 23 from its end, and the position of the sensor is adjusted along the mounting groove 23. The second set screw 30, which has been loosened, is then tightened to press its tip against the bottom of the groove to fix the sensor 20 at that position.

As described above, the above embodiment can mount the fixture 21 on the tie rod 5 at the correct angle regardless of whether the sensor 20 is mounted in the fixture 21. Thus, the sensor 20 can be mounted in the fixture 21 mounted on the tie rod 5 or the fixture 21 on which the sensor 20 is mounted can be mounted on the tie rod 5, thereby improving the workability during mounting. In addition, to replace the sensor 20 or to adjust its position, the sensor 20 can be independently installed and removed simply by loosening the second set screw 30 and without loosening the first set screws 26 that fix the fixture 21, thereby improving the workability during maintenance.

Although the illustrated embodiment forms the sensor fixture 21 with a length equal to a fraction of that of the cylinder tube 2, the fixture 21 can be formed to be as long as the cylinder tube 2. In this case, the fixture 21 may remain fixed to the tie rod 5 even if the mounting position of the sensor 20 must be totally changed.

What is claimed is:

1. A sensor mounting device for mounting a sensor which detects an operating position of a piston in a fluid pressure cylinder, said sensor mounting device comprising:

a sensor mounting fixture for mounting the sensor on a tie rod extending along a cylinder tube of the fluid pressure cylinder, wherein said sensor mounting fixture includes:

a proximal end attached to the tie rod of the fluid pressure cylinder;

a distal end having a tip portion;

an abutting portion located adjacent to said tip portion, wherein said abutting portion abuts the cylinder tube of the fluid pressure cylinder to establish a mounting position of said sensor mounting fixture;

a first mounting groove located adjacent to said proximal end of said sensor mounting fixture, wherein said first mounting groove contacts a portion of an outer periphery of the tie rod of the fluid pressure cylinder; and first set screws for fixing said sensor mounting fixture to the tie rod of the fluid pressure cylinder;

a second mounting groove located adjacent to both of said tip portion and said abutting portion, wherein the sensor is mounted in said second mounting groove in such a way that a position of the sensor can be adjusted with respect to an axial direction of the cylinder tube of the fluid pressure cylinder so that the sensor never contacts the cylinder tube of the fluid pressure cylinder.

2. The sensor mounting device according to claim 1, wherein the sensor is mounted in said second mounting groove at an arbitrary position using a second set screw, said second set screw and said first set screws having parallel longitudinal axes so that a tool rotates said second set screw and said first set screws are rotated in a same direction to tighten said second set screw and said first set screws against the tie rod of the fluid pressure cylinder and said sensor mounting fixture, respectively.

3. The sensor mounting device according to claim 2, wherein said second mounting groove has a cross sectional shape of a first width tapering to a second width such that said second width is adjacent a surface opening of said second mounting groove and said first width is adjacent a bottom of said second mounting groove, said bottom of said second mounting groove being contacted by a tip of said second set screw when said second set screw is rotated so as to penetrate a thickness of the sensor so that the sensor is pressed against an edge of said surface opening of said second mounting groove to fix the sensor on said sensor mounting fixture.

* * * * *